Figure 1:
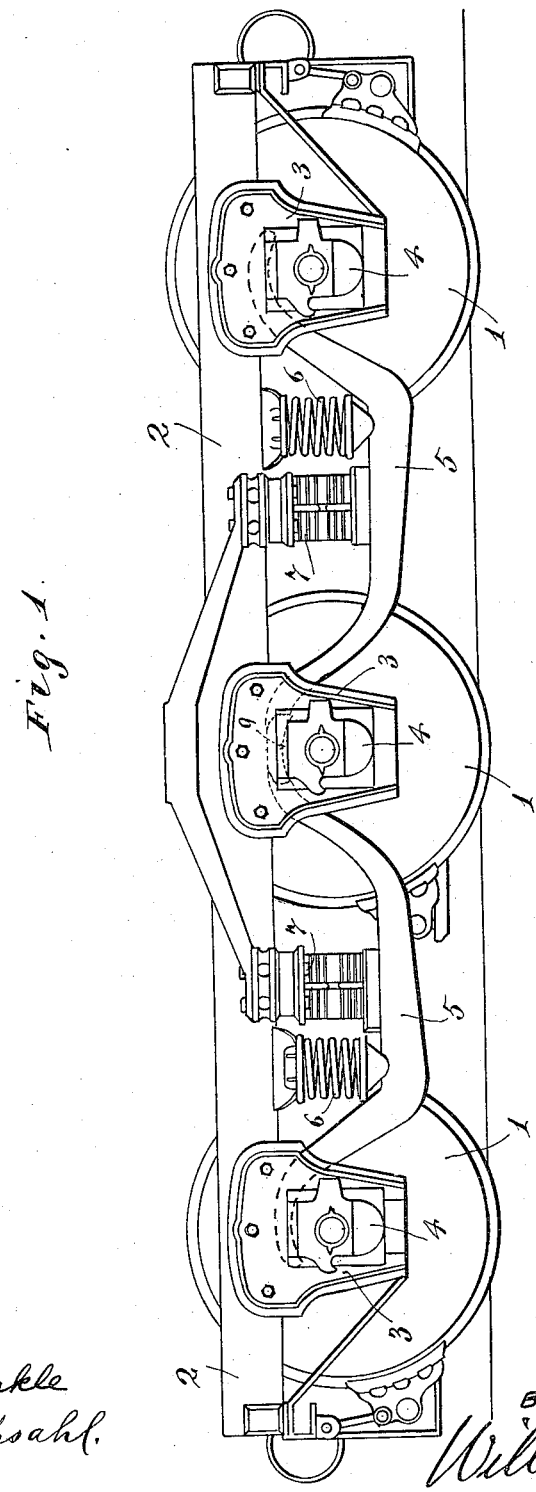

W. J. SCHLACKS.
EQUALIZED CAR TRUCK.
APPLICATION FILED JUNE 27, 1914.

1,148,629.

Patented Aug. 3, 1915.
2 SHEETS—SHEET 2.

WITNESSES
E. C. Skinkle
A. H. Opsahl

INVENTOR
W. J. Schlacks
BY HIS ATTORNEYS
Williamson Merchant

UNITED STATES PATENT OFFICE.

WILLIAM J. SCHLACKS, OF CHICAGO, ILLINOIS, ASSIGNOR TO McCORD AND COMPANY, OF CHICAGO, ILLINOIS, A CORPORATION OF NEW JERSEY.

EQUALIZED CAR-TRUCK.

1,148,629.  Specification of Letters Patent.  Patented Aug. 3, 1915.

Application filed June 27, 1914. Serial No. 847,733.

*To all whom it may concern:*

Be it known that I, WILLIAM J. SCHLACKS, a citizen of the United States, residing at Chicago, in the county of Cook and State of Illinois, have invented certain new and useful Improvements in Equalized Car-Trucks; and I do hereby declare the following to be a full, clear, and exact description of the invention, such as will enable others skilled in the art to which it appertains to make and use the same.

My invention relates to car trucks of the equalized pedestal type, and has for its object to provide an improved equalizer bar seat on the journal boxes, whereby certain improved results hereinafter noted, are attained.

Generally stated, the invention consists of the novel construction and combination of parts hereinafter described and defined in the claims.

Railroads generally, have had considerable trouble with the journal boxes on the center wheels of six-wheeled trucks of the equalized pedestal type, due to the fact that the two equalizer bars on the same side of the truck, meet on top of the center box. The known function of an equalizer, in trucks of this character, is to take the up and down movement and thus relieve the truck frame. The two equalizers on the same side of the truck of the character above noted could not, of course, perform their intended function if the load were always equal on both. Otherwise stated, the load on one equalizer is not the same as the load on the other equalizer whose ends terminate together on top of the same center box. When the right hand equalizer is loaded heavier than its normal proportion, the left hand equalizer is loaded just that much lighter than its normal proportion. These varying loads, first on one side of the center line of the box, and then on the other, cause the boxes to tip or rock sidewise, and produce undue wear on the pedestals and the boxes, and the wear that occurs under the above conditions will be, for example, on the one upper corner, and the lower diagonal corner.

As another illustration, it may be stated that in the ordinary truck structures, the ends of the equalizers should be applied to the center boxes, extended about half way over the same, overlapping a ridge that is cast on the tops of the boxes at the center line. With this arrangement, when the brakes are set, the brake shoe on the left of the center wheel and on the right of the right hand wheels, tends to pull these wheels together, and this force is transmitted by the journals to the brasses which bear against the side lugs. The equalizer on the center and left hand wheels, then tends to keep the tops of the boxes in proper "wheel base," and the journals acting on the lower part of the side lugs; and this tends to tip the center boxes so that the bottoms of the boxes are inclined toward the right hand wheels.

My invention has for its object to overcome the above noted undesirable conditions, and, broadly stated, consists in providing the tops of the journal boxes with cylindrical or rounded equalizer engaging seats or surfaces, and providing the ends of the equalizing bars with correspondingly curved or rounded seat engaging surfaces. This improved arrangement prevents backward and forward rocking movements of the journal boxes, and at the same time, gives the equalizer, always, a full bearing, no matter how high the right or the left hand wheels may be, this being, as above noted, an action that is very different from that obtained with flat top boxes.

By extending the bearing of the equalizers on the rounded top box, down to a point where the vertical line through the axis of the journal intersects the curve of the top, it will very much reduce the leverage of the force that tends to tip the boxes. On the center boxes, the equalizers should be extended considerably beyond the point just noted, and this is accomplished by overlapping the said equalizers on top of the center boxes. The outer ends of the equalizers should also be extended well over the rounded tops of the end journal boxes.

In the accompanying drawings which illustrate the invention, like characters indicate like parts throughout the several views.

Figure 2:
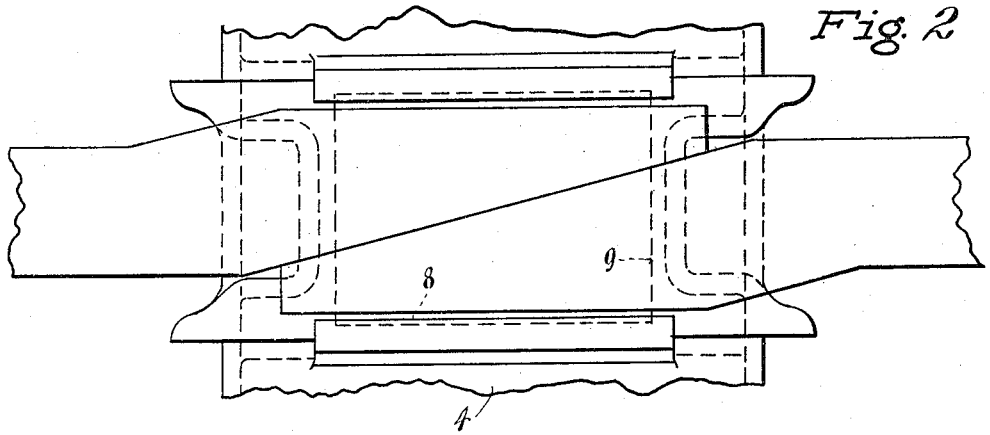
Figure 3:
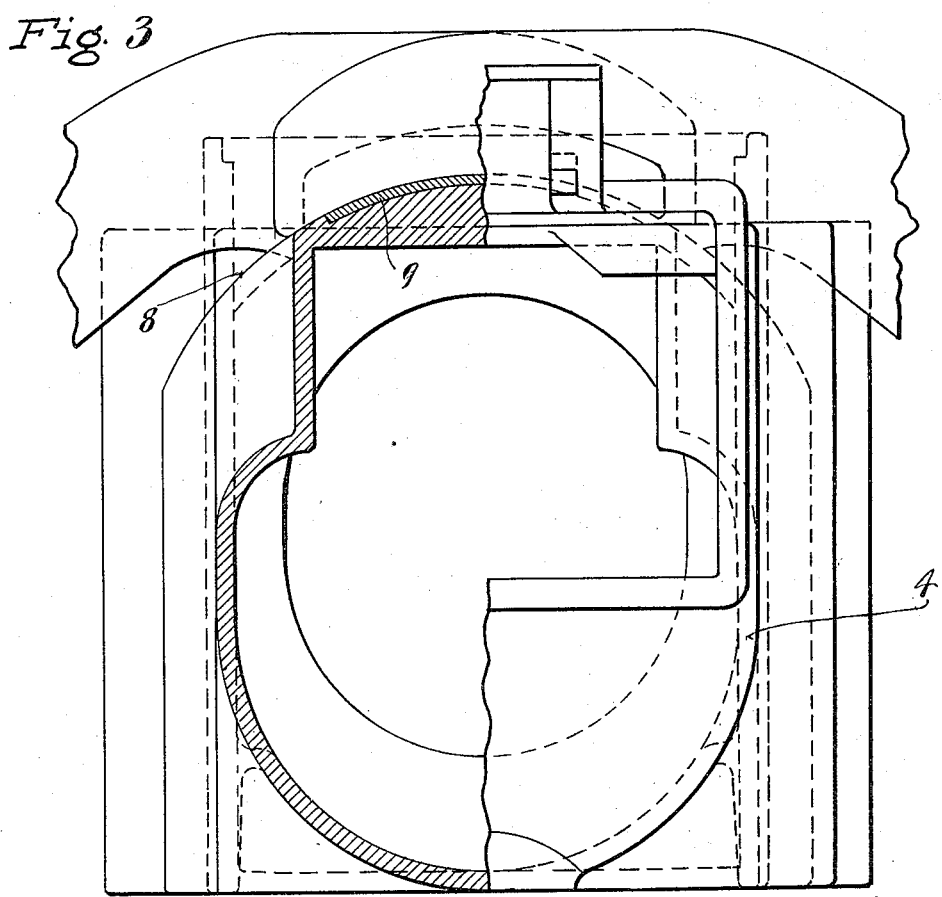

Referring to the drawings, Figure 1 is a view in side elevation showing a six-wheel equalized pedestal truck embodying my invention; Fig. 2 is a fragmentary plan view showing one of the center journal boxes and the equalizer bars applied thereto; and Fig. 3 is a side elevation of the parts shown in Fig. 2, with some parts sectioned and some parts broken away.

Of the parts of the car truck, it is desirable, for the purposes of this case to specifically note only the wheels 1, the truck frame 2, the pedestals 3, the journal boxes 4, equalizers 5 and springs 6 and 7. As best shown in Fig. 3, the top of the journal box therein shown is formed with a rounded or cylindrical top surface 8 into which, preferably, is set a steel wearing plate 9 which may be secured thereto in the process of casting, or otherwise. This cylindrical surface 8 is preferably struck from a radius, the center of which will be co-incident with the axes of the wheels and axle when the "brasses" and journal are about one-half worn. To illustrate this statement, suppose there is a one-fourth inch allowable reduction by wear on the brass, which would cause the top of the box to approach the center of the journal one-fourth inch, and suppose also that there is allowed a one-fourth of an inch reduction in diameter of the journal. This would cause the top of the box to approach the center of the journal by one-eighth of an inch more, making the total approach three-eighths of an inch. Hence, I preferably take for the radius of the rounded top of the box, the distance therefrom to the axis of the box with everything new, minus one-half (1/2) the reduction in this distance which will be produced by the permissible wear, and which reduction may be assumed to be 3/16ths of an inch.

The tops of all of the journal boxes, to-wit, the end and central boxes, are preferably formed with like curves, and the equalizer bars, at their ends, are formed with box engaging surfaces corresponding in curve to the curve of the said rounded tops or surfaces 8. The equalizer bars, at their outer ends, are made the full width of the rounded surfaces 9 on the end boxes, but the said equalizer bars, at their inner ends, are reduced and overlapped, preferably on an oblique line, as shown in Fig. 2, so that the two overlapped ends cover approximately the entire rounded top of the box with which they engage. By obliquely cutting the overlapped ends of the equalizer bars, the fullest possible bearing and maximum strength is attained, and furthermore, the pressure of the overlapped equalizers on the center box is extended the greatest possible distance over the top of the box, in a direction transversely of the truck.

Obviously, with the rounded top journal boxes, and correspondingly formed equalizers or equalizing bars, the tendency to rock the boxes under movements of the equalizer is reduced to a minimum, and, in fact, rendered negligible.

What I claim is:

1. In an equalized car truck, the combination with journal boxes and journals therein, of cylindrical equalizer supporting surfaces supported on the tops of said boxes, the axes of which cylindrical supporting surfaces are parallel to the axes of coöperating journals, and equalizers seated on said cylindrical surfaces and having movement thereon under movements of the truck springs.

2. In an equalized car truck, the combination with journal boxes and journals therein, of cylindrical equalizer supporting surfaces supported on the tops of said boxes, the axes of which equalizer supporting surfaces are parallel to the axes of coöperating journals, and equalizers having correspondingly curved cylindrical end surfaces bearing on the cylindrical top surfaces of said boxes and having movement thereon under movement of the top springs.

3. In a six-wheeled car truck wherein the central journal boxes have rounded tops, equalizers having their inner ends overlapped and provided with rounded surfaces seated on the rounded tops of said boxes in full contact therewith at points both forward and rearward of the vertical line extended centrally through the box.

4. In a six-wheeled truck, the combination with end and intermediate journal boxes having rounded tops, of equalizers having ends with rounded surfaces corresponding to and resting on the rounded tops of said boxes, the inner ends of the said equalizers being overlapped on the central boxes.

5. In a six-wheeled car truck, the combination with end and intermediate journal boxes having tops that are rounded on the arc of a circle, the center of which is at the central portion of the respective box, in combination with equalizers having surfaces that are rounded to correspond to and rest upon the rounded tops of said boxes, the said equalizers at their inner ends, being overlapped on the tops of the said intermediate boxes.

6. In a six-wheeled car truck wherein the central boxes have rounded tops, equalizers, the inner ends of which are beveled and overlapped and are formed with box engaging surfaces, curved to correspond to the rounded tops of said boxes and seated thereon.

In testimony whereof I affix my signature in presence of two witnesses.

WILLIAM J. SCHLACKS.

Witnesses:
DONALD D. MILLIKIN,
C. W. RUDOLPH.

Copies of this patent may be obtained for five cents each, by addressing the "Commissioner of Patents, Washington, D. C."